No. 853,072. PATENTED MAY 7, 1907.
J. N. EAMES.
COMBINATION WEED GATHERER AND CUTTER.
APPLICATION FILED APR. 7, 1906.
2 SHEETS—SHEET 1.
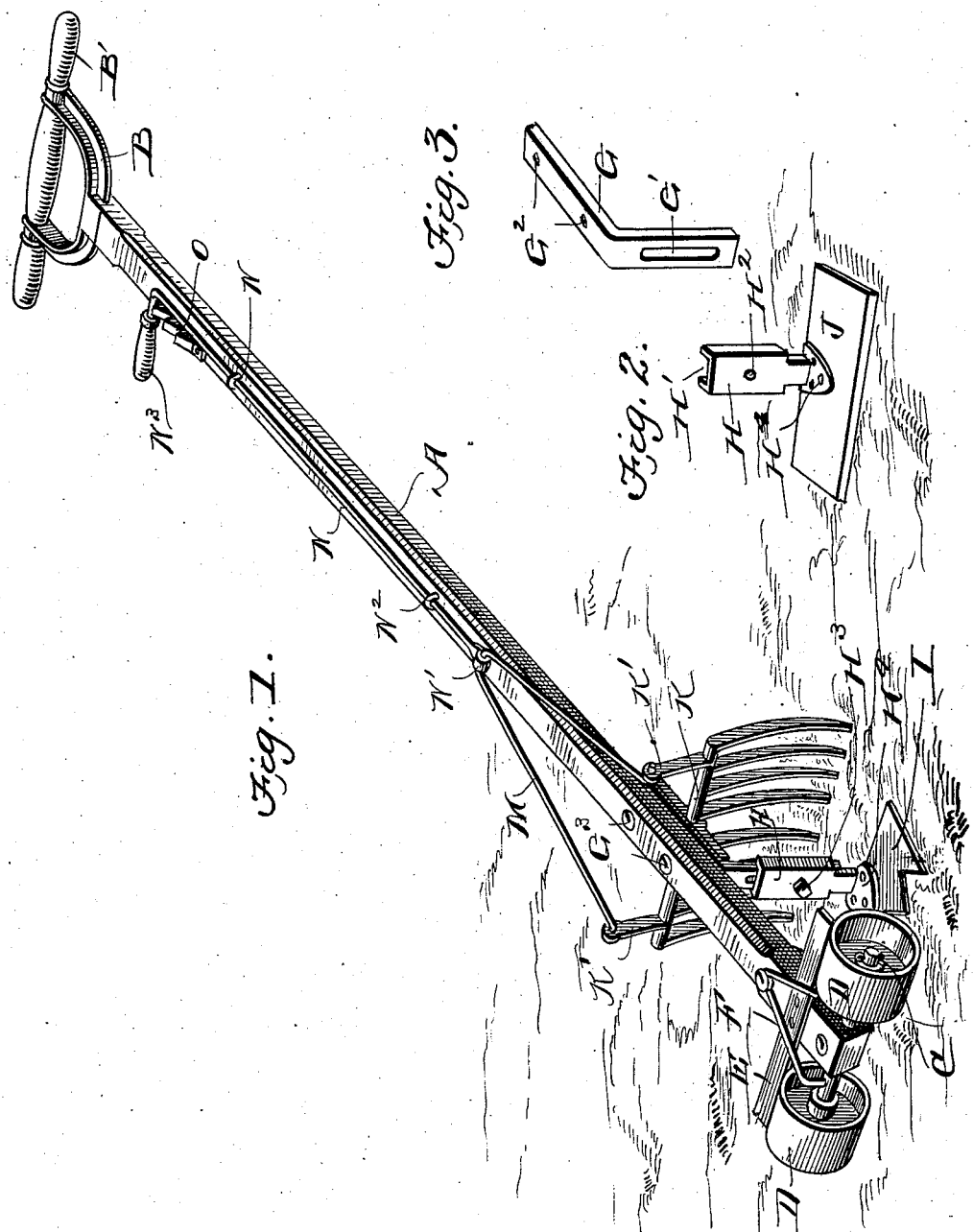
WITNESSES:
INVENTOR
J. N. Eames
BY
ATTORNEYS No. 853,072. PATENTED MAY 7, 1907.
J. N. EAMES.
COMBINATION WEED GATHERER AND CUTTER.
APPLICATION FILED APR. 7, 1906.
2 SHEETS—SHEET 2.
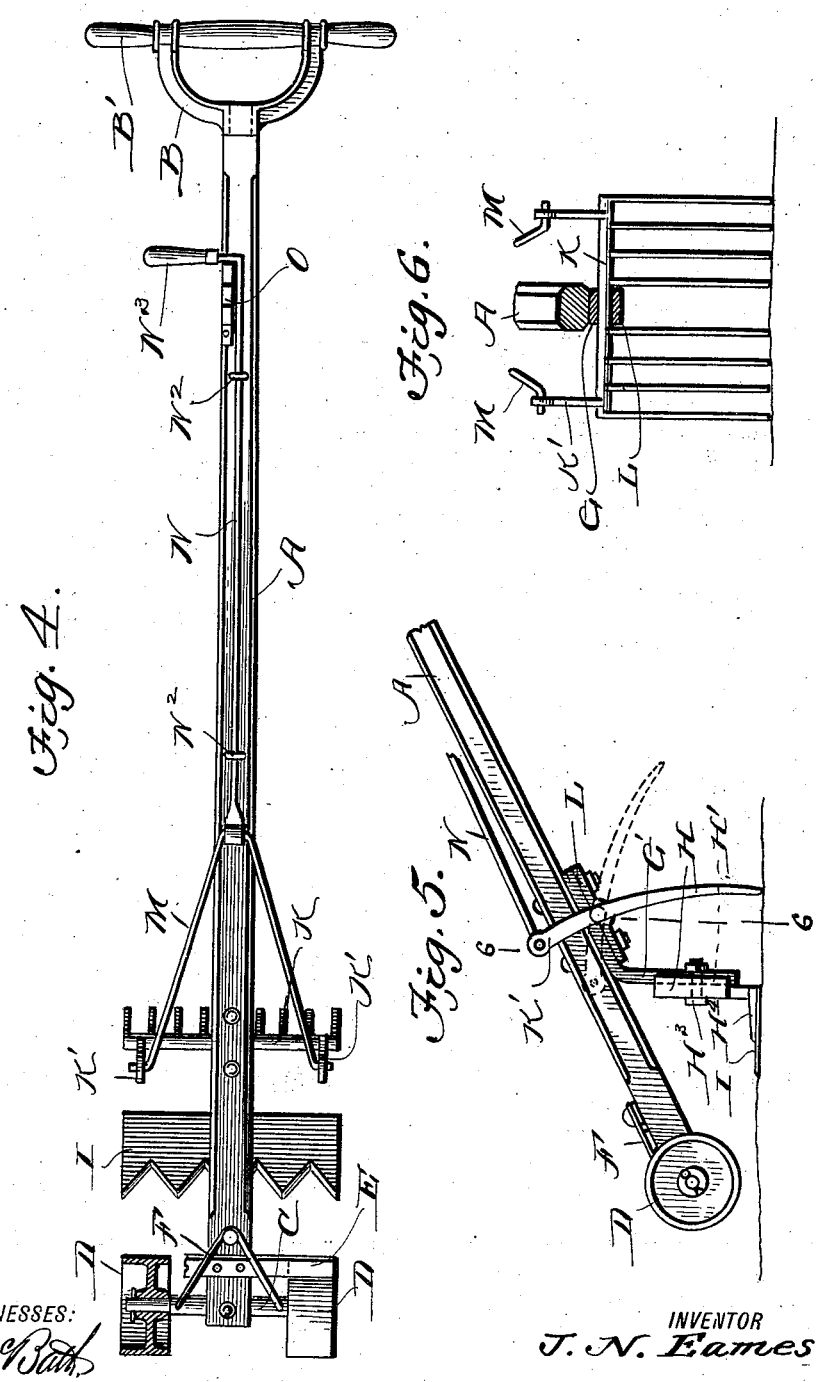
WITNESSES:
INVENTOR
J. N. Eames
BY
Meara & Buck
ATTORNEYS
THE NORRIS PETERS CO., WASHINGTON, D. C.

UNITED STATES PATENT OFFICE.

JOHN N. EAMES, OF MEDFORD, MASSACHUSETTS.

COMBINATION WEED GATHERER AND CUTTER.

No. 853,072.　　　Specification of Letters Patent.　　　Patented May 7, 1907.

Application filed April 7, 1906. Serial No. 310,545.

*To all whom it may concern:*

Be it known that I, JOHN N. EAMES, a citizen of the United States, residing at Medford, in the county of Middlesex and State of Massachusetts, have invented a new and useful Improvement in a Combination Weed Gatherer and Cutter, of which the following is a specification.

This invention relates to weeders and more particularly to a combination weed gatherer and cutter, the object being to provide a device which is very simple and cheap in construction and one which is very effective in use.

Another object of my invention is to provide the weeder with a rake so that weeds can be raked up in piles, as the weeder is moved along.

The invention consists in the novel features of construction, combination and arrangements of parts, hereinafter fully described, and pointed out in the claims.

In the drawings forming a part of this specification:—Figure 1 is a perspective view of my improved weeder. Fig. 2 is a perspective view of one of the cutters used with the weeder, detached. Fig. 3 is a perspective view of the supporting arm detached. Fig. 4 is a top plan view of the weeder partly in section. Fig. 5 is a side view of the weeder partly broken away. Fig. 6 is a section taken on the line 6—6 of Fig. 5.

In the drawings A, indicates a bar having a forked member B, secured on its upper end provided with a handle B'. An axle C, is secured transversely in the lower end of the bar by a bolt having reduced outer ends on which are mounted wide metal wheels D, secured thereon by cotter-pins. A scraper E, is secured on the bar and is adapted to lie over the wheels D, and prevent them from becoming clogged with mud. The axle C, is provided with openings in which the ends of the brace F, connected to a pin carried by the bar, are adapted to fit and securely hold the axle.

Secured to the under side of the bar A, by bolts $G^3$, is an angle plate G provided with a slot G', and spaced openings $G^2$, through which the bolts $G^3$, are adapted to pass. A leg H, provided with a vertical groove H', having an opening $H^2$, leading therein, is adapted to fit around the portion of the angle plate with the slot and be adjustably secured thereto by a bolt $H^3$. A foot $H^4$, is formed on the lower end of the leg, carrying a cutter I, provided with a serrated cutting edge, or a cutter J, with a straight edge can be used with the same result.

A rake K, is mounted in the recess of the plate L, secured on the bolts $G^3$, provided with upwardly projecting lugs K', adjacent each end in which the ends of the bowed rod M, are adapted to fit. The rod is secured in the apertured end N', of the rod N, mounted in eyes $N^2$, secured to the top of the bar. The upper end of the bar N, is bent at right angles and is provided with a handle $N^3$, and is adapted to engage a rack O secured to the bar A, and by means of which the rake can be swung so as to deposit its load or adjust it to any angle desired.

Having thus fully described my invention, what I claim as new and desire to secure by Letters Patent is:—

1. In a weeder, the combination with a bar, of an adjustable cutter, a rake pivoted at the rear of said cutter, lugs projecting from said rake provided with rounded apertured ends, a bowed rod having its ends inserted in said apertures, and suitable means connected to said bowed rod for adjusting the rake at a desired angle, for the purpose described.

2. In a weeder, the combination with a bar provided with wheels at one end and a handle at the other, of an adjustable cutter secured to said bar, a rake pivoted to said bar, lugs upwardly projecting from said rake, a bowed rod provided with outwardly bent ends pivoted to said lugs and a rod slidably mounted on the bar, connected at one end to the bowed rod and bent at the other to form a handle for the purpose described.

3. In a device of the kind described, the combination with a bar provided with a handle at its upper end, of an axle provided with wheels secured to the lower end of said bar, an angle plate secured to said bar, a grooved leg adjustably secured on said plate provided with a foot carrying a cutter, a rake pivoted to said bar to the rear of said rake, a rack secured on the upper end of said bar, and a rod mounted on said bar connected to said rake adapted to engage said rack, for the purpose described.

JOHN N. EAMES.

Witnesses:
　JAMES JOHNSTON,
　CARRIE S. SLEEPER.